(12) United States Patent
von Flotow

(10) Patent No.: US 10,144,511 B2
(45) Date of Patent: Dec. 4, 2018

(54) HELICOPTER-MEDIATED SYSTEM AND METHOD FOR LAUNCHING AND RETRIEVING AN AIRCRAFT

(71) Applicant: Hood Technology Corporation, Hood River, OR (US)

(72) Inventor: Andreas H. von Flotow, Hood River, OR (US)

(73) Assignee: Hood Technology Corporation, Hood River, OR (US)

( * ) Notice: Subject to any disclaimer, the term of this patent is extended or adjusted under 35 U.S.C. 154(b) by 507 days.

(21) Appl. No.: 14/230,454

(22) Filed: Mar. 31, 2014

(65) Prior Publication Data

US 2015/0314871 A1 Nov. 5, 2015

Related U.S. Application Data

(60) Provisional application No. 61/808,392, filed on Apr. 4, 2013, provisional application No. 61/807,508, filed on Apr. 2, 2013.

(51) Int. Cl.
*B64D 1/12* (2006.01)
*B64D 5/00* (2006.01)
*B64C 39/02* (2006.01)
*B64D 3/00* (2006.01)

(52) U.S. Cl.
CPC ............ *B64D 1/12* (2013.01); *B64C 39/024* (2013.01); *B64D 3/00* (2013.01); *B64D 5/00* (2013.01); *B64C 2201/082* (2013.01); *B64C 2201/182* (2013.01)

(58) Field of Classification Search
CPC ... B64D 5/00; B64D 3/00; B64D 3/02; B64D 1/12; B64D 1/22; B64C 39/022; B64C 2201/182; B64C 2201/082
See application file for complete search history.

(56) References Cited

U.S. PATENT DOCUMENTS

| 968,339 | A | 8/1910 | Geraldson |
| 1,144,505 | A | 6/1915 | Steffan |
| 1,306,860 | A | 6/1919 | Smith |
| 1,383,595 | A | 7/1921 | Black |
| 1,499,472 | A | 7/1924 | Pratt |
| 1,582,188 | A | 4/1926 | Mummert |
| 1,625,020 | A | 4/1927 | Guillermo |

(Continued)

FOREIGN PATENT DOCUMENTS

| CA | 781808 | 4/1968 |
| CA | 839101 | 4/1970 |

(Continued)

OTHER PUBLICATIONS

International Search Report and Written Opinion for International Application No. PCT/US14/32518, dated Dec. 8, 2014 (9 pages).

(Continued)

*Primary Examiner* — Brian M O'Hara
(74) *Attorney, Agent, or Firm* — Neal, Gerber & Eisenberg LLP

(57) ABSTRACT

Various embodiments of the present disclosure provide a helicopter-mediated system and method for launching and retrieving an aircraft capable of long-distance efficient cruising flight from a small space without the use of a long runway.

11 Claims, 2 Drawing Sheets

(56) References Cited

U.S. PATENT DOCUMENTS

| | | |
|---|---|---|
| 1,686,298 A | 10/1928 | Uhl |
| 1,716,670 A | 6/1929 | Sperry |
| 1,731,091 A | 10/1929 | Clayton |
| 1,748,663 A | 2/1930 | Tucker |
| 1,836,010 A | 12/1931 | Audrain |
| 1,848,828 A | 3/1932 | Griffin |
| 1,912,723 A | 6/1933 | Perkins |
| 2,415,071 A | 2/1947 | Brie |
| 2,435,197 A | 2/1948 | Brodie |
| 2,440,574 A | 4/1948 | Cotton |
| 2,448,209 A | 8/1948 | Boyer et al. |
| 2,488,050 A | 11/1949 | Brodie |
| 2,488,051 A | 11/1949 | Brodie |
| 2,552,115 A | 5/1951 | Replogle |
| 2,807,429 A | 9/1957 | Hawkins, Jr. et al. |
| 2,843,337 A | 7/1958 | Bennett |
| 2,944,815 A | 7/1960 | Moyer |
| 3,017,138 A | 1/1962 | Flint |
| 3,029,049 A | 4/1962 | Melville |
| 3,146,974 A | 9/1964 | Petoia |
| 3,351,325 A | 11/1967 | Cotton |
| 3,785,316 A | 1/1974 | Leming et al. |
| 3,980,259 A | 9/1976 | Greenhalgh et al. |
| 4,079,901 A | 3/1978 | Mayhew et al. |
| 4,116,408 A | 9/1978 | Soloy |
| 4,123,020 A | 10/1978 | Korsak |
| 4,147,317 A | 4/1979 | Mayhew et al. |
| 4,267,987 A | 5/1981 | McDonnell |
| 4,311,290 A | 1/1982 | Koper |
| 4,523,729 A | 6/1985 | Frick |
| 4,575,026 A | 3/1986 | Brittain et al. |
| 4,680,962 A | 7/1987 | Durbin |
| 4,753,400 A | 6/1988 | Reuter et al. |
| 4,757,959 A * | 7/1988 | Schroder ............. B64D 3/00 244/137.4 |
| 4,790,497 A | 12/1988 | Yoffe |
| 4,842,222 A | 6/1989 | Baird |
| 5,000,398 A | 3/1991 | Rashev |
| 5,039,034 A | 8/1991 | Burgess et al. |
| 5,042,750 A | 8/1991 | Winter |
| 5,054,717 A | 10/1991 | Taylor |
| 5,092,540 A | 3/1992 | Burgess et al. |
| 5,687,930 A | 11/1997 | Wagner et al. |
| 5,799,900 A | 9/1998 | McDonnell |
| 5,806,795 A | 9/1998 | Ortelli |
| 6,264,140 B1 | 7/2001 | McGeer et al. |
| 6,824,102 B2 | 11/2004 | Haggard |
| 6,874,729 B1 * | 4/2005 | McDonnell ............. B64C 25/68 244/63 |
| 6,961,018 B2 | 11/2005 | Heppe et al. |
| 7,028,947 B2 | 4/2006 | Burns |
| 7,066,430 B2 | 6/2006 | Dennis et al. |
| 7,097,137 B2 | 8/2006 | McDonnell |
| 7,104,495 B2 | 9/2006 | McGeer |
| 7,121,507 B2 | 10/2006 | Dennis et al. |
| 7,140,575 B2 | 11/2006 | McGeer et al. |
| 7,143,974 B2 | 12/2006 | Roeseler et al. |
| 7,143,976 B2 | 12/2006 | Snediker et al. |
| 7,152,827 B2 | 12/2006 | McGeer |
| 7,165,745 B2 | 1/2007 | McGeer et al. |
| 7,175,135 B2 | 2/2007 | Dennis et al. |
| 7,219,856 B2 | 5/2007 | Watts et al. |
| 7,264,204 B1 | 9/2007 | Portmann |
| 7,344,108 B2 | 3/2008 | Muylaert et al. |
| 7,360,741 B2 | 4/2008 | McGeer et al. |
| 7,410,125 B2 | 8/2008 | Steele |
| 7,464,650 B2 | 12/2008 | Steinkerchner et al. |
| 7,510,145 B2 | 3/2009 | Snediker |
| 7,530,527 B2 | 5/2009 | Kelleher |
| 7,543,780 B1 | 6/2009 | Marshall et al. |
| 7,562,843 B2 | 7/2009 | Lipponen |
| 7,665,691 B2 | 2/2010 | Hanzlick et al. |
| 7,712,702 B2 | 5/2010 | McGeer et al. |
| 7,954,758 B2 | 6/2011 | McGeer et al. |
| 8,162,256 B2 | 4/2012 | Gossen et al. |
| 8,172,177 B2 | 5/2012 | Lovell et al. |
| 8,231,083 B2 | 7/2012 | Kutzmann et al. |
| 8,245,968 B2 | 8/2012 | McGeer et al. |
| 8,276,844 B2 | 10/2012 | Kariv |
| 8,292,215 B2 | 10/2012 | Olm et al. |
| 8,313,057 B2 | 11/2012 | Vasilievich |
| 8,348,193 B2 | 1/2013 | McGeer et al. |
| 8,453,966 B2 | 6/2013 | McGeer et al. |
| 8,464,981 B2 | 6/2013 | Goldie et al. |
| 8,573,536 B2 | 11/2013 | McGeer et al. |
| 8,596,576 B1 | 12/2013 | McGeer et al. |
| 8,672,264 B1 | 3/2014 | McGeer et al. |
| 8,708,277 B1 | 4/2014 | McGeer et al. |
| 8,708,278 B2 | 4/2014 | McGeer et al. |
| 8,714,482 B2 | 5/2014 | McGeer et al. |
| 8,740,134 B2 | 6/2014 | Suzuki |
| 8,740,142 B2 | 6/2014 | McGeer et al. |
| 8,944,373 B2 | 2/2015 | Dickson et al. |
| 8,950,698 B1 | 2/2015 | Rossi |
| 8,955,801 B2 | 2/2015 | McGeer et al. |
| 9,004,402 B2 | 4/2015 | McGeer et al. |
| 9,010,683 B2 | 4/2015 | Gundlach et al. |
| 9,193,481 B2 | 11/2015 | McGeer et al. |
| 2002/0100838 A1 | 8/2002 | McGeer et al. |
| 2003/0222173 A1 | 12/2003 | McGeer et al. |
| 2004/0256519 A1 | 12/2004 | Ellis et al. |
| 2005/0178894 A1 | 8/2005 | McGeer et al. |
| 2012/0223182 A1 | 9/2012 | Gilchrist et al. |
| 2013/0161447 A1 | 6/2013 | McGeer et al. |
| 2014/0263852 A1 | 9/2014 | Walker et al. |
| 2015/0129716 A1 | 5/2015 | Yoffe |

FOREIGN PATENT DOCUMENTS

| | | |
|---|---|---|
| CN | 204822072 | 12/2015 |
| EP | 0 472 613 | 4/1992 |
| EP | 2 186 728 | 5/2010 |
| GB | 2 071 031 | 9/1981 |
| WO | WO 01/07318 | 2/2001 |
| WO | WO 2008/015663 | 2/2008 |
| WO | WO 2013/171735 | 11/2013 |

OTHER PUBLICATIONS

Mini-RPV Recovery System Conceptual Study, Prepared for Eustis Directorate U.S. Army Air Mobility Research and Development Laboratory, Aug. 1977 (322 pages).

A miniature powerplant for very small, very long range autonomous aircraft, S.P. Hendrickson and T. McGeer, Final Report under U.S. DoE contract No. DE-FG03-96ER82187, Sep. 1999, (23 pp.).

Aerosonde hazard estimation, T. McGeer, 1994, (7 pp).

Aerosonde Pacific reconnaissance: ready when you are!, T. McGeer, Pacific Northwest Weather Workshop, Mar. 2005, (15 pp).

An Airspeed Vector Sensor for V/STOL Aircraft, E. J. Durbin and T. McGeer, Journal of Aircraft, vol. 19 No. 6, Jun. 1982, (7 pp).

Automated Launch, Recovery, and Refueling for Small Unmanned Aerial Vehicles, K. Mullens et al., 2004 (11 pp).

Autonomous Aerosondes for Economical Atmospheric Soundings Anywhere on the Globe, G. J. Holland, T. McGeer and H.H. Youngre, Bulletin of the American Meteorological Society, vol. 73 No. 12, Dec. 1992 (12 pp).

Flexrotor Long-Endurance VTOL Aircraft Transitions to Wing-Borne Flight, available at http://www.aerovelco.com/papers/FlexrotorTransitionsAnnouncement.pdf, dated Aug. 4, 2011 (2 pages).

Laima: The First Atlantic Crossing by Unmanned Aircraft, T. McGeer, Feb. 1999, (25 pp).

Quantitative Risk Management as a Regulatory Approach to Civil UAVs, T. McGeer, L. Newcombe, and J. Vagners, International Workshop on UAV Certification, Jun. 1999, (11 pp).

Regulatory Issues Involving Long-Range Weather Observation by Aerosonde Autonomous Aircraft, T. McGeer, Oct. 1998, (8 pp).

Rotary Action, description of scene of License to Kill, available at http://www.rotaryaction.com/pages/licetkil.html.

Safety, Economy, Reliability and Regulatory Policy of Unmanned Aircraft, T. McGeer, Mar. 2007, (9 pp).

(56) References Cited

OTHER PUBLICATIONS

Skyhook (Harrier handling system); Harpoon Head Quarters; available at http://www.harpoondatabases.com/encyclopedia/Entry2979.aspx; printed Jun. 21, 2013 (3 pages).
The Beartrap—A Canadian Invention, Crowsnest Magazine, vol. 17, No. 3 and 4 [online], Mar.-Apr. 1965, [retrieved on Sep. 14, 2007]. Retrieved from the Internet at <URL: http://www.readyayeready.com/timeline/1960s/beartrap/index.htm>. (4 pp).
Wide-Scale Use of Long-Range Miniature Aerosondes Over the World's Oceans, T. McGeer and J. Vagners, 1999, (25 pp).
Extended European Search Report for EP 14814301.9, dated Nov. 7, 2016 (9 pages).

\* cited by examiner

HELICOPTER-MEDIATED SYSTEM AND METHOD FOR LAUNCHING AND RETRIEVING AN AIRCRAFT

PRIORITY CLAIM

This patent application claims priority to and the benefit of U.S. Provisional Patent Application No. 61/808,392, filed on Apr. 4, 2013, and U.S. Provisional Patent Application No. 61/807,508, filed on Apr. 2, 2013, the entire contents of each of which are incorporated herein by reference.

BACKGROUND

It is well known in the aeronautical sciences that an aircraft capable of hover and/or of slow flight is typically not well-suited to long-distance efficient cruising flight. This is the case because hover/slow flight and long-distance efficient cruising flight require very different components for the generation of aerodynamic lift.

One drawback of aircraft capable of long-distance efficient cruising flight is that such aircraft typically require long runways to be utilized for take-off and landing. This becomes problematic when there is not sufficient space for the requisite runway, meaning that such aircraft may not be used.

Thus, there is a need for new manners by which aircraft that otherwise require a long runway may be launched and retrieved from small spaces.

SUMMARY

The present disclosure solves the above-described problems by providing a helicopter-mediated system and method for launching and retrieving an aircraft capable of long-distance efficient cruising flight from a small space without the use of a long runway.

In one example embodiment, a helicopter includes a first connector connected to and extending from the helicopter, and an aircraft includes a second connector connected to and extending from the aircraft. The first connector includes a first mating device at an end opposite the end connected to the helicopter, and the second connector includes a second mating device at an end opposite the end connected to the aircraft. The first and second mating devices and are configured to mate with one another and releasably connect to one another to link the helicopter with the aircraft and facilitate launch and retrieval of the aircraft without the use of a long runway. The first and second connectors and the respective first and second mating devices are configured to enable the helicopter and the aircraft to rendezvous and securely connect to one another both: (a) when the helicopter is airborne and the aircraft is on the ground, and (b) when the helicopter is airborne and the aircraft is airborne. The first and second connectors and the respective first and second mating devices are configured to enable the helicopter and the aircraft to disconnect from to one another both: (a) when the helicopter is airborne and the aircraft is on the ground, and (b) when the helicopter is airborne and the aircraft is airborne.

In another example embodiment, a helicopter includes an aircraft capturer connected to and extending from the helicopter. In this example, the aircraft capturer includes a tether connected to and extending from the helicopter and a capture device connected to an end of the tether opposite the end of the tether connected to the helicopter. The capture device includes a mating device specifically-configured to mate with and releasably connect to a portion of the aircraft that is specifically-configured to accept the mating device and the mechanical forces associated therewith. This connection links the helicopter with the aircraft and facilitates launch and retrieval of the aircraft without the use of a long runway.

Additional features and advantages of the present invention are described in, and will be apparent from the following Detailed Description and the Figures.

DETAILED DESCRIPTION

Figure 1:
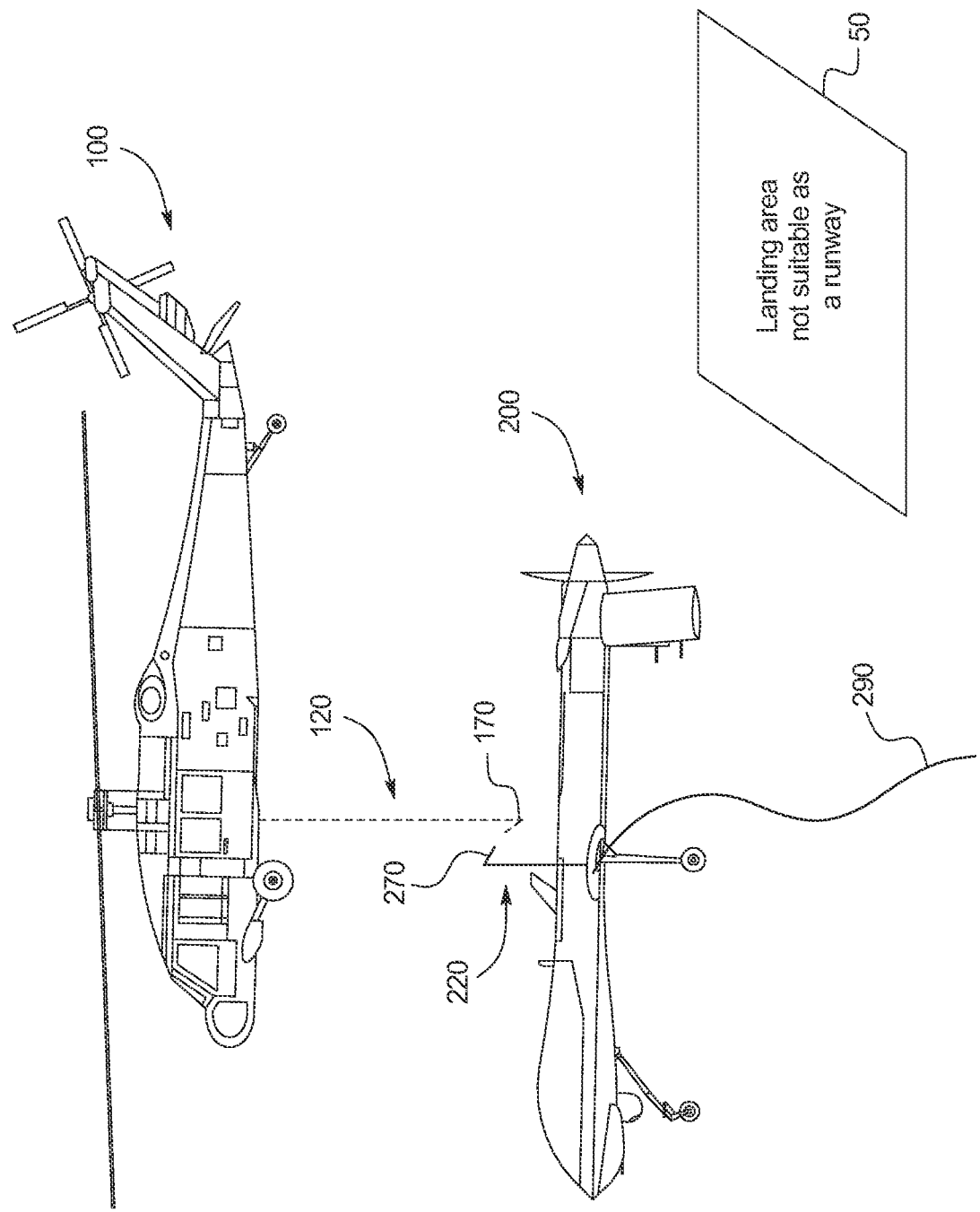
FIG. 1 is a side view of example devices of the present disclosure that facilitate helicopter-mediated launch and retrieval of an aircraft.

Referring now to the drawings, in one example embodiment illustrated in FIG. 1, a helicopter 100 includes a first connector 120 connected to and extending from the helicopter 100, and an aircraft 200 (such as a fixed-wing aircraft capable of long-distance efficient cruising flight or any other suitable aircraft) includes a second connector 220 connected to and extending from the aircraft 200. In one embodiment, at least a portion of the first connector is flexible and the second connector is rigid. In another embodiment, both the first connector and the second connector are rigid. In another embodiment, the first connector is rigid and at least a portion of the second connector is flexible. In another embodiment, at least a portion of the first connector is flexible and at least a portion of the second connector is flexible.

The first connector 120 includes a first gripper or mating device 170 at a bottom end (with respect to the orientation shown in FIG. 1), and the second connector 220 includes a second gripper or mating device 270 at a top end (with respect to the orientation shown in FIG. 1). The first and second mating devices 170 and 270 are configured to mate with one another and releasably connect to one another (such as by latching together or otherwise mechanically securely coupling together) to link the helicopter 100 with the aircraft 200 and facilitate launch and retrieval of the aircraft 200 (as described below). In certain embodiments, at least one of the first and second connectors includes a locking mechanism configured to connect and lock the first and second mating devices together and to disconnect and release the first and second mating devices from one another. It should be appreciated that, once mated and connected to one another, the mating devices 170 and 270 only disconnect from each other when it is desired to separate the linkage between the helicopter 100 and the aircraft 200.

The first connector 120 is configured to enable the first mating device 170 to rendezvous with, mate with, and connect to the second mating device 270 of the second connector 220 both: (a) when linkage between the helicopter 100 and the aircraft 200 is desired when the helicopter 100 is airborne and the aircraft 200 is substantially stationary (such as when the aircraft 200 is on the ground and not moving relative to the ground), and (b) when linkage between the helicopter 100 and the aircraft 200 is desired when the helicopter 100 the aircraft 200 are both in forward flight. It should be appreciated that the first connector is stabilized and tip-guided to facilitate such procedures while the helicopter 100 is in forward flight.

The second connector 220 is configured to create a rendezvous target with sufficient physical separation from sensitive components of the aircraft 200 such that any impact between such sensitive components and the first connector 120 during mating and connecting of first and second mating devices 170 and 270 is unlikely. Additionally, the second connector 220 is configured to minimize weight and to minimize drag, particularly when the aircraft 200 is in wing-borne flight, whether the second connector 220 is in a deployed configuration, as shown in FIG. 1, or in a stowed configuration (not shown).

It should be appreciated that the first and second connectors are configured to stably support the aircraft when it is linked with the helicopter.

In this example embodiment, the aircraft 200 includes one or more retractable lay lines 290 deployable from, and retractable into (when not in use), any suitable portion of the aircraft 200 (such as the wings of the aircraft 200). In this example embodiment, as described below, the lay lines 290 are deployed during retrieval to enable a ground crew and/or ground equipment to guide the aircraft 200 safely into the landing area 50.

To launch the aircraft 200 when the aircraft 200 is initially stationary (such as when the aircraft 200 is on the ground and not moving relative to the ground), in one example, the first mating device 170 of the first connector 120 is mated with and connected to the second mating device 270 of the second connector 220 of the aircraft 200 (such as via the locking mechanism) to link the helicopter 100 with the aircraft 200. In one example embodiment, this is accomplished by maneuvering the helicopter 100 relative to the aircraft 200 such that the first mating device 170 of the first connector 120 of the helicopter 100 mates with and connects to the second mating device 270 of the second connector 220 of the aircraft 200 to link the helicopter 100 with the aircraft 200. After the helicopter 100 is linked with the aircraft 200, the helicopter 100 hoists the aircraft 200 to a desired altitude and accelerates to bring the aircraft 200 to a suitable airspeed. Once the desired altitude and airspeed are reached, the first and second mating devices 170 and 270 are disconnected from each other. Once the first and second mating devices 170 and 270 are disconnected from one another, the aircraft 200 is released into wing-borne flight.

In various embodiments, to facilitate releasing the aircraft 200 into wing-borne flight, the linked, airborne helicopter 100 and aircraft 200 are operated such that the loads on the connected first and second mating devices 170 and 270 of the first and second connectors 120 and 220 are minimized just before the first and second mating devices 170 and 270 are disconnected from one another. Once such loads are minimized, the first and second mating device 170 and 270 are disconnected from one another, such as by: (a) the first mating device 170 initiating the disconnection from the second mating device 270, (b) the second mating device 270 initiating the disconnection from the first mating device 170, (c) the first mating device 170 and the second mating device 270 initiating the disconnection from the other mating device, or (d) a device separate from the first and second mating devices 170 and 270 initiating the disconnection of the first and second mating devices 170 and 270.

In various example embodiments, to minimize the loads on the connected first and second mating devices 170 and 270 of the first and second connectors 120 and 220 to facilitate the disconnection of the first and second mating devices 170 and 270 (and, therefore, the disconnection of the helicopter 100 and the aircraft 200 and the release of the aircraft 200 into wing-borne flight): (a) the helicopter 100 descends relative to the aircraft 200, (b) the helicopter 100 descends relative to the aircraft 200 and reduces its speed relative to the speed of the aircraft 200, (c) the aircraft 200 ascends relative to the helicopter 100, (d) the aircraft 200 ascends relative to the helicopter 100 and increases its speed relative to the speed of the helicopter 100, or (e) any suitable combination thereof.

To retrieve the aircraft 200 from wing-borne flight, the helicopter 100 rendezvous with the aircraft 200 in flight and maneuvers such that the first mating device 170 of the first connector 120 of the helicopter 100 mates with and connects to the second mating device 270 of the second connector 220 of the aircraft 200 to link the helicopter 100 with the aircraft 200. The linked helicopter 100 and aircraft 200 then slow (such as by independently decreasing the speed of both the helicopter and the aircraft), and as the linked helicopter 100 and aircraft 200 gradually slow, the helicopter 100 gradually accepts the weight of the aircraft 200. The helicopter 100 then lowers the aircraft 200 to the landing area 50, which is not of sufficient size to enable the aircraft 200 to utilize the landing area 50 for take-off or landing (though it should be appreciated that the landing area may, in other embodiments, be of sufficient size to enable the aircraft to utilize the landing area for take-off or landing).

As the helicopter 100 lowers the aircraft 200 to the landing area, the lay lines 290 may be deployed. As the aircraft 200 nears the landing area 50, if the lay lines 290 are deployed, the ground crew and/or ground equipment may use the lay lines 290 to guide the aircraft 200 over and onto the landing area 50. The first and second mating devices 170 and 270 are then disconnected from each other (such as in any of the manners described above), breaking the linkage between the helicopter 100 and the aircraft 200 and enabling the helicopter to perform other activities.

In the above-described example embodiment, the aircraft is stationary prior to being hoisted by the helicopter. In another embodiment, the aircraft is mobile prior to being hoisted by the helicopter. For example, a short runway may be utilized to slowly move the aircraft prior to the helicopter hoisting the aircraft.

Figure 2:
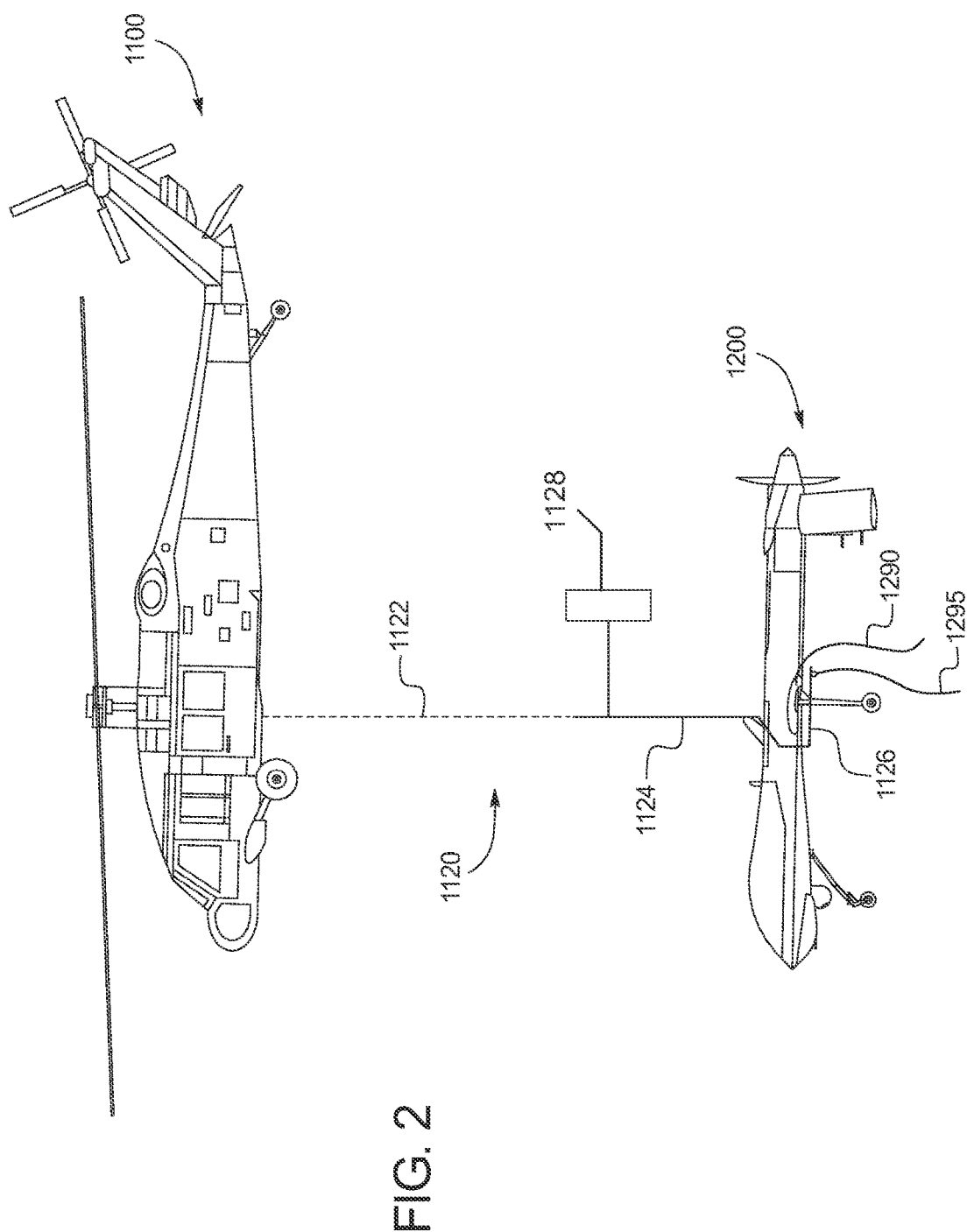
FIG. 2 is a side view of other example devices of the present disclosure that facilitate helicopter-mediated launch and retrieval of an aircraft.

Turning to FIG. 2, in another example embodiment, a helicopter 1100 includes an aircraft capturer 1120 connected to and extending from the helicopter 1100. In this example, the aircraft capturer 1120 includes a flexible tether 1122 (though in other embodiments the tether is rigid or at least partially rigid) connected to and extending from the helicopter 1100 and a capture device 1124 connected to an end of the tether 1122 opposite the end of the tether 1122 connected to the helicopter 1100. The capture device 1124 includes a mating device 1126 configured to mate with and releasably connect to (such as by latching to or otherwise mechanically coupling to) a portion of the aircraft 1200. Thus, the mating device 1126 is configured to releasably connect the capture device 1124 (and, therefore, the aircraft capturer 1120) to the portion of an aircraft 1200. This connection links the helicopter 1100 with the aircraft 1200 and facilitates launch and retrieval of the aircraft 1200 (as described below). In certain embodiments, at least one of the mating device and the aircraft includes a locking mechanism configured to connect and lock the mating device together with the aircraft and to disconnect and release the mating device and the aircraft from one another. It should be appreciated that, once the mating device 1126 connects to the aircraft 1200, the mating device 1126 only disconnects from the aircraft 1200 when it is desired to separate the linkage between the helicopter 1100 and the aircraft 1200.

The aircraft capturer is configured to fly stably when trailed below a cruising helicopter while being guided into appropriate contact with an aircraft. For instance, in this example embodiment, the aircraft capturer 1120 includes a stabilizer 1128 configured to stabilize the aircraft capturer 1120 during flight. The aircraft capturer also includes features that enable stable behavior of the linked helicopter and aircraft in all phases of flight, including hover, forward flight, acceleration, and deceleration. Further, the aircraft capturer is configured to stably support the aircraft when it is linked with the helicopter.

In this example, the aircraft 1200 includes one or more lay lines 1290 and the mating device 1126 includes one or more lay lines 1295, which are described above. In this example, the lay lines are retractable, while in other embodiments the lay lines are not retractable. In other embodiments, only one of the aircraft and the mating device includes one or more lay lines. In further embodiments, the aircraft capturer includes one or more lay lines that are stowable somewhere other than the mating device.

To launch the aircraft 1200 when the aircraft 1200 is initially stationary, in one example, the helicopter 1100 is maneuvered such that the mating device 1126 mates with and connects to a portion of the aircraft 1200 to link the helicopter 1100 with the aircraft 1200. After the helicopter 1100 is linked to the aircraft 1200, the helicopter 1100 hoists the aircraft 1200 to a desired altitude and accelerates to bring the aircraft 1200 to a suitable airspeed. Once the desired altitude and airspeed are reached, the mating device 1126 is disconnected from the aircraft 1200, breaking the linkage between the helicopter 1100 and the aircraft 1200 and releasing the aircraft 1200 into wing-borne flight.

To retrieve the aircraft 1200 from wing-borne flight, the helicopter 1100 rendezvous with the aircraft 1200 in flight and maneuvers such that the mating device 1126 of the capture device 1124 mates with and connects to the portion of the aircraft 1200 to link the helicopter 1100 with the aircraft 1200. The linked helicopter 1100 and aircraft 1200 then slow (such as by independently decreasing the speed of both the helicopter and the aircraft), and as the linked helicopter 1100 and aircraft 1200 gradually slow, the helicopter 1100 gradually accepts the weight of the aircraft 1200. The helicopter 100 then lowers the aircraft 1200 to the landing area (not shown), which is not of sufficient size to enable the aircraft 1200 to utilize the landing area for take-off or landing (though it should be appreciated that the landing area may, in other embodiments, be of sufficient size to enable the aircraft to utilize the landing area for take-off or landing).

As the helicopter 1100 lowers the aircraft 1200 to the landing area, the lay lines 1290 and/or 1295 may be deployed. As the aircraft 1200 nears the landing area, if the lay lines 1290 and/or 1295 are deployed, the ground crew and/or ground equipment may use the lay lines 1290 and/or 1295 to guide the aircraft 1200 over and onto the landing area. The mating device 1126 is then disconnected from the aircraft 1200, breaking the linkage between the helicopter 1100 and the aircraft 1200 and enabling the helicopter 1120 to perform other activities.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for launching an aircraft into wing-borne flight using a helicopter, said method comprising:
    mechanically connecting a first mating device attached to the aircraft to a second mating device connected to the helicopter;
    engaging a locking mechanism of the helicopter to prevent the first mating device from disconnecting from the second mating device;
    after connecting the first mating device to the second mating device and after engaging the locking mechanism, hoisting the aircraft using the helicopter and bringing the aircraft to a designated air speed using the helicopter; and
    after bringing the aircraft to the designated air speed:
        disengaging the locking mechanism to enable the first mating device to disconnect from the second mating device; and
        after disengaging the locking mechanism, initiating, via the second mating device, disconnection of the first mating device from the second mating device to release the aircraft into wing-borne flight.

2. The method of claim 1, further including retrieving the aircraft from wing-borne flight using the helicopter.

3. The method of claim 1, wherein the second mating device is positioned below the helicopter.

4. The method of claim 3, wherein the first mating device extends above the aircraft.

5. The method of claim 1, wherein the first mating device extends toward a tail of the aircraft.

6. A helicopter-mediated system for launching an aircraft, said system comprising:
    a helicopter;
    a first mating device connected to and positioned below the helicopter, the first mating device releasably connectable to a second mating device attached to the aircraft; and
    a locking mechanism engageable to prevent the second mating device from disconnecting from the first mating device and disengageable to enable the second mating device to disconnect from the first mating device,
    wherein the first mating device is configured to, when the locking mechanism is disengaged, initiate disconnection of the second mating device from the first mating device.

7. The system of claim 6, wherein the second mating device extends toward a tail of the aircraft.

8. A method for launching an aircraft into wing-borne flight using a rotorcraft in which lift and thrust are supplied by rotors, said method comprising:
    mechanically connecting a mating device connected to the rotorcraft to a portion of the aircraft;
    engaging a locking mechanism to prevent the mating device from disconnecting from the portion of the aircraft;
    after connecting the mating device to the portion of the aircraft and after engaging the locking mechanism, hoisting the aircraft using the rotorcraft and bringing the aircraft to a designated air speed using the rotorcraft; and
    after bringing the aircraft to the designated air speed:
        disengaging the locking mechanism to enable the mating device to disconnect from the portion of the aircraft; and
        after disengaging the locking mechanism, initiating, via the mating device, disconnection of the portion of the aircraft from the mating device to release the aircraft into wing-borne flight.

9. The method of claim 8, wherein the rotorcraft is a helicopter.

10. A rotorcraft-mediated system for launching an aircraft, said system comprising:
   a rotorcraft in which lift and thrust are supplied by rotors;
   a mating device connected to and positioned below the helicopter, the mating device releasably connectable to a portion of the aircraft; and
   a locking mechanism engageable to prevent the portion of the aircraft from disconnecting from the mating device and disengageable to enable the portion of the aircraft to disconnect from the mating device,
   wherein the mating device is configured to, when the locking mechanism is disengaged, initiate disconnection of the portion of the aircraft from the mating device.

11. The rotorcraft-mediated system of claim 10, wherein the rotorcraft is a helicopter.

\* \* \* \* \*